United States Patent [19]

Sheppard

[11] Patent Number: 4,838,761

[45] Date of Patent: Jun. 13, 1989

[54] METHODS AND APPARATUS FOR PREVENTING OR RETARDING FRUIT AND VEGETABLE FREEZING

[76] Inventor: Alan R. Sheppard, 204 Cornwall Dr., Pittsburgh, Pa. 15238

[21] Appl. No.: 913,083

[22] Filed: Sep. 29, 1986

Related U.S. Application Data

[63] Continuation of Ser. No. 716,325, Mar. 26, 1985, abandoned, which is a continuation-in-part of Ser. No. 523,737, Aug. 16, 1983, abandoned.

[51] Int. Cl.$^4$ ............... F04D 29/34; A01G 13/00
[52] U.S. Cl. ............... 416/170 R; 47/2; 416/148
[58] Field of Search ........... 416/54, 55, 102, 148, 416/170 R, 202, 214 R, 214 A, 208, 142 B; 47/2, 1.41; 126/59.5

[56] References Cited

U.S. PATENT DOCUMENTS

| 1,398,927 | 11/1921 | Whitlock | 47/2 |
|---|---|---|---|
| 1,499,894 | 7/1924 | Waterman | 47/2 |
| 1,811,303 | 6/1931 | De La Cierva | 416/202 |
| 1,993,635 | 3/1935 | Towt | 416/95 X |
| 2,054,383 | 9/1936 | Ludewig | 416/202 |
| 2,230,165 | 1/1941 | Prock | 416/55 |
| 2,317,629 | 4/1943 | McCauley | 416/208 |
| 2,444,539 | 7/1948 | Sharpes | 416/202 |
| 2,481,702 | 9/1949 | Towt | 417/364 |
| 2,492,615 | 12/1949 | Biermann | 416/208 |
| 2,529,339 | 11/1950 | Irvine et al. | 416/205 X |
| 2,655,764 | 10/1953 | Watkins | 47/2 |
| 2,661,068 | 12/1953 | Gaskill | 416/205 |
| 2,736,137 | 2/1956 | Thaheld | 47/2 |
| 2,742,095 | 4/1956 | Pitcairn et al. | 416/148 |
| 2,807,120 | 9/1957 | Graham | 47/2 |
| 2,830,669 | 4/1958 | Klockner | 416/102 X |
| 2,836,932 | 6/1958 | Potter | 47/2 |
| 2,895,259 | 7/1959 | Beckett | 416/142 B X |
| 2,944,610 | 7/1960 | Gluhareff | 416/148 |
| 3,003,282 | 10/1961 | Davies | 47/2 |
| 3,067,541 | 12/1962 | Smith | 47/2 |
| 3,180,570 | 4/1965 | Grabowski | 416/110 |
| 3,243,890 | 4/1966 | Easterday | 34/33 |
| 3,288,358 | 11/1966 | Coles | 416/110 |
| 3,306,533 | 2/1967 | Vertrees et al. | 417/364 |
| 3,409,221 | 11/1968 | Patterson | 239/8 |
| 3,784,319 | 1/1974 | Amer et al. | 416/148 |
| 4,092,084 | 5/1978 | Barltrop | 416/148 |
| 4,148,594 | 4/1979 | Stafford | 416/62 X |
| 4,333,728 | 6/1982 | Drees et al. | 416/148 X |
| 4,439,108 | 3/1984 | Will | 416/202 |
| 4,449,889 | 5/1984 | Belden | 416/102 X |
| 4,501,089 | 2/1985 | Cobden | 47/2 |
| 4,644,683 | 2/1987 | Jones | 47/2 X |

FOREIGN PATENT DOCUMENTS

| 1024980 | 4/1953 | France | 416/102 |
|---|---|---|---|
| 23258 | 10/1969 | Japan | 416/148 |
| 470757 | 8/1937 | United Kingdom | 416/148 |

Primary Examiner—Everette A. Powell, Jr.
Attorney, Agent, or Firm—Buchanan Ingersoll

[57] ABSTRACT

Apparatus is provided for protecting crops such as fruit tree groves from frost damage in the form of a vertical tower fixed to the earth against gyration, a rotor on top with two airfoil blades extending upward at a conical angle and drive means drivingly connected to the rotor through a vertical shaft, said tower projecting substantially above the level of the trees to be protected and sufficient to pick up air in the inversion layer and deliver it to the ground in a generally cylindrical mass to provide a ground effect causing the air to spread out radially along the surface beneath a grove's foliage and then flow upwardly through the foliage.

9 Claims, 3 Drawing Sheets

METHODS AND APPARATUS FOR PREVENTING OR RETARDING FRUIT AND VEGETABLE FREEZING

This application is a continuation of application Ser. No. 716,325, Filed Mar. 26, 1985, which in turn was continuation-in-part of application Ser. No. 523,737 Filed Aug. 16, 1983, both now abandoned.

The damaging freezes which occur in the fruit and vegetable industries are a well-known occurrence. These freezes are generally known to be due primarily to the formation of atmospheric inversions over a fairly wide area. This condition normally occurs on clear, calm, cold nights and is characterized by an atmosphere in which air temperature increases with altitude. Unfortunately, and inversion is an inherently stable condition which tends to persist until wind velocities increase or until daybreak, at which time incoming solar radiation begins to warm the earth and trees.

The freezing of foliage and of the crop is purely a radiation phenomena, brought on by the inversion, in which the soil, foliage and fruit all radiate heat to space. The result is that the atmoshere cools from the ground upward. As a result, it is not uncommon to find temperature differnetials of 10° or more between the ground and 60 foot levels above the ground.

The existence of this warmer air mass at higher elevations represents a very large potential energy source which can be used to offset a grove's net radiation heat loss.

There have been many methods and apparatus proposed in an effort to solve this freeze problem. Perhaps, the best known and most time honored is the use of "smudge pots" scattered through the area to be protected. While these are somewhat effective, they fall far short of being the real answer to the problem. It has also been proposed to use wind machines to create a surface wind simulating that which, when it naturally occurs, reduces the freeze damage. Such machines are illustrated in Towt U.S. Pat. No. 2,481,702; Potter U.S. Pat. No. 2,836,932; Beckett U.S. Pat. No. 2,895,259; Graboswki U.S. Pat. No. 3,180,570, Coles U.S. Pat. No. 3,288,353; and Vertrees et al. U.S. Pat. No. 3,309,533. The difficulty with such machines is that they were useful only on very calm nights and were at best very inefficient because they simply mixed the cold air next to the ground with somewhat warmer air at a limited height above the ground so that the effective raising of the temperature of the operative air mass at plant level was very low. In order to overcome this problem some attempts were made to draw air down from a higher level through a vertical duct and distribute it horizontally along the ground as in Graham Pat. No. 2,807,120. Unfortunately, such machines were not strong enough or effective enough to accomplish the result sought. Another approach is that shown in Davies U.S. Pat. No. 3,003,282 which attempted to combine the approach of drawing higher level air down through a duct with the smudge pot approach by heating it at ground level and then blowing it horizontally across the surface. Such an approach is expensive and difficult to use. Still another proposal is that of Smith U.S. Pat. No. 3,067,541 which uses rotors having nozzles along the trailing edge for spraying fertilizer, pesticides, fog dispersal substances, smoke and heat to the air. This is very complex structure designed to disperse air widely above a localized section.

The present invention involves the transportation of large volumes of air from the higher, warm air levels existing during inversionary conditions down to the grove or orchard floor and spreading it out radially under the foliage canopies in the form of a "horizontal wake". As this horizontal wake is warmer, and therefore lighter, than the air above it, and because of the friction imposed by the ground and lower foliage level, a portion of this wake tends to ascend through and between the trees as it spreads radially, transferring its heat to the foliage and fruit.

A hovering, or stationary, rotor operating in a horizontal plane derives the majority of its air from a distance one rotor diameter above the plane of the rotor "disk". Furthermore, the maximum velocity which can be imparted to that air is twice the average velocity of the air passing through the rotor disk, this velocity occurring at a distance of one rotor diameter below the plane of that rotor.

The present invention is based upon the general precepts above, but more importantly, upon three characteristics of the horizontal wake which are unique to the rotor operating in "ground effect", i.e. within one rotor diameter above the earth:

(1) the horizontal wake of such a rotor is composed of a very large number of vortices having a rectrograde spin, similar to a backward spinning tennis ball. This characteristic makes the wake tend to hug the ground, this tendency being opposed by the convective bouyance and friction effects noted above, and provides the horizontal range required to make the invention a viable frost-protection device;

(2) the extreme turbulance of the horizontal wake acts to greatly increase the heat transfer coefficient between the air of the wake and the foliage and fruit; and (3) the horizontal wake is very thin and maximum air velocities occur within a distance 2% to 5% of the rotor radius above the ground. This phenomena acts also to give the air flow a useable range.

The use of the ground effect phenomena is a totally new concept in dealing with the frost problem, differentiating this invention from those of the past, none of which can be effective in severe conditions.

I provide an apparatus and method for protecting crops, especially treeborne crops, against freezing which provides a rotor having at least two blades, each of an air-foil section, a blade retaining member connecting said blades, said retaining member being bent upward to form a "coning angle" to satisfy the rotor's structural requirements, a retaining member clamp which is "underslung" and pivots around a horizontal axis in a rotor yoke, a vertical tower which is fixed to the earth to inhibit gyration, a vertical drive shaft journaled in a tower and fixed to the rotor yoke at the top of that tower, drive means drivingly connected to the drive shaft at the bottom of the tower, said tower extending substantially above the level of the trees to be protected, a distance sufficient to pick up air in the inversion area but within the ground effect zone, and to deliver it to the ground in a generally cylindrical mass until it approaches the ground, at which time expansion of the compressed wake causes it to turn outward and move radially along the ground.

The rotor radius, and thus the tower height, is a function of grove geometry. If, for example, $R_r$ = the rotor radius;

$R_w$ = the radial distance form the rotor's axis of rotation to the nearest foliage;

$h_i$ = the tree skirt height;

$u_o$ = the average velocity of the air passing through the rotor disk; and $u_w$ the averag velocity of the air entering the grove or orchard under the foliage of the trees, which ideally is $2u_0$, then as the air entering the grove must equal in quantity that passing through the rotor disk, $$pi \times R_r^2 \times U_o = 2pi \times R_w h_i$$

In a grove or orchard having a 25'×25' tree spacing, 3' shirt heights and a skirt diameter of 20', $R_r = \sqrt{180}$, or 13.42'.

Preferably the rotor is of a "teetering" design to avoid wing sensitivity caused by the differential lift created when one blade advances into a wind and the other retreats from it. The blade presently preferred is a Boeing VR7.1 blade.

The coning angle, imparted from the upward bend of the blade retaining member, is such that the vertical component of the centrifugal forces poses the lifting moment of each blade. As a result of this structure, there is no net lifting moment on the blades, all lift forces being translated to shear.

The undersling of the blade retaining member with respect to its teetering axis eliminates the undesirable moment caused by the Coriolus forces inherent in a coned rotor. In the foregoing general description of the invention, I have set out certain objects, purposes and advantages of this invention. Other objects, purposes and advantages of the invention will be apparent from a consideration of the following description and the accompanying drawings in which.

Figure 4:
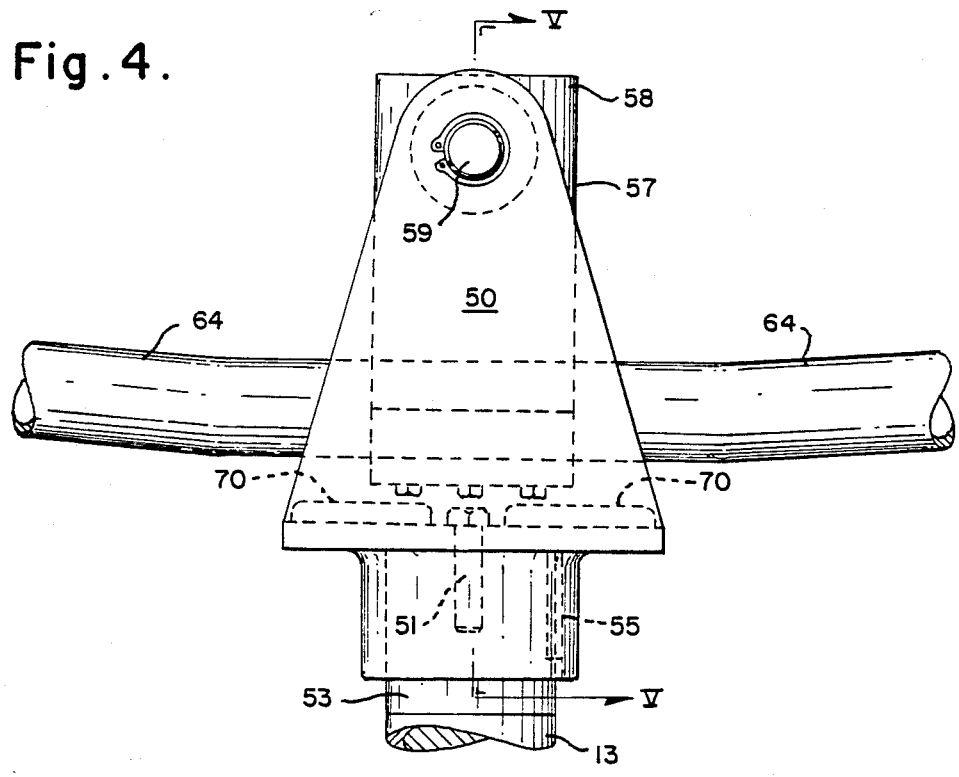
FIG. 4 is an enlarged elevational view at right angles to the view of FIG. 3.
Figure 5:
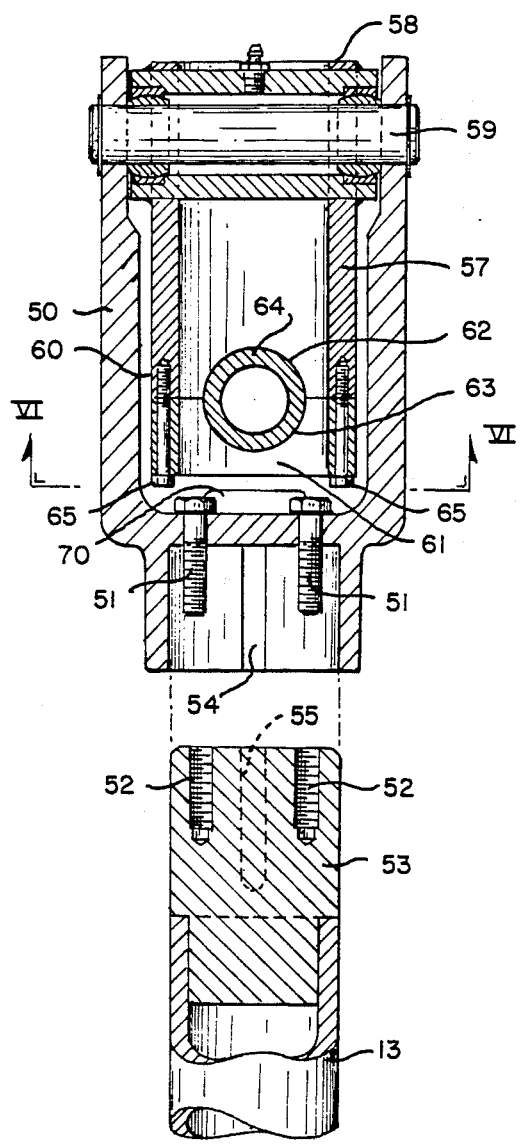
Figure 6:
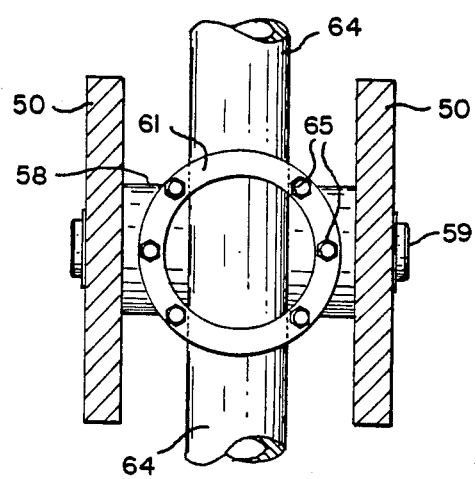

FIG. 5 is a section on line V—V of FIG. 4; and FIG. 6 is a section on line VI—VI of FIG. 5. Referring to the drawing, I have illustrated a tower 10 mounted on a gear box 11 fixed to a concrete pad 12 in an orchard. A vertical drive shaft 13 extends upwardly through the tower and is journaled at the top of the tower in bearing 14, in the middle, and at the bottom of the tower in bearing 15. Blade retaining tube 64 is fixed to a clamp 57 pivoting in yoke 50 on top of drive shaft 13. The blade retaining tube has a positive dihedral which carries airfoil blades 19. The lower end of the drive shaft 13 carries a bevel drive gear 20 which engages a bevel gear 21 at right angles thereto. Gear 21 is mounted on one end of a horizontal power shaft 22 which shaft extends out of housing 11 through bearings 23, 24. The other end of shaft 22 is connected to a drive means 25, such as an engine directly connected to the gear box.

Figure 1:
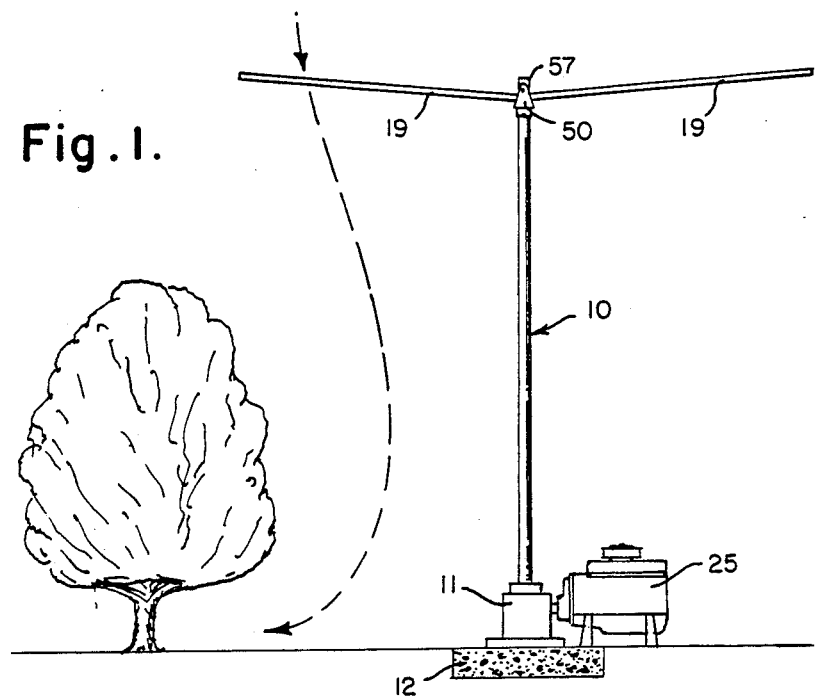
FIG. 1 is a side elevational view of an apparatus according to this invention installed in an orchard or grove.
Figure 2:
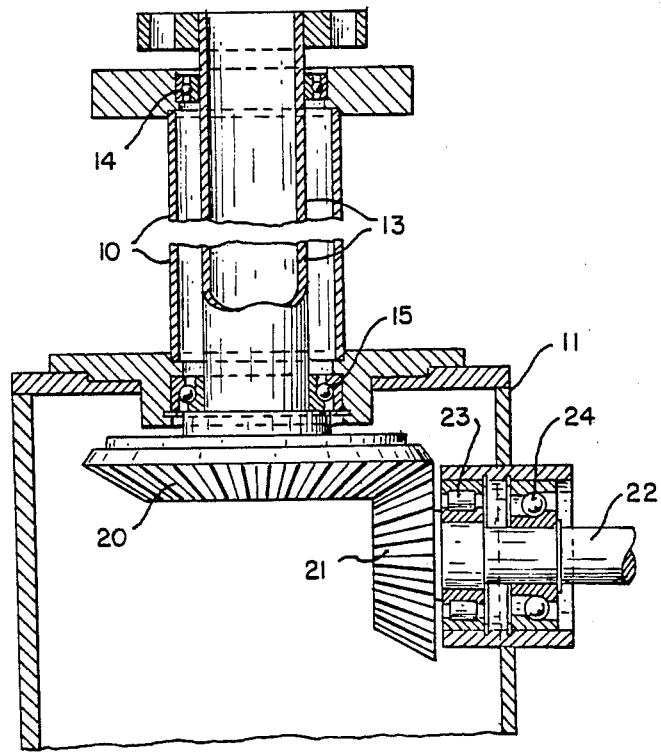
FIG. 2 is a fragmentary section of the tower base and gear box of FIG. 1.
Figure 3:
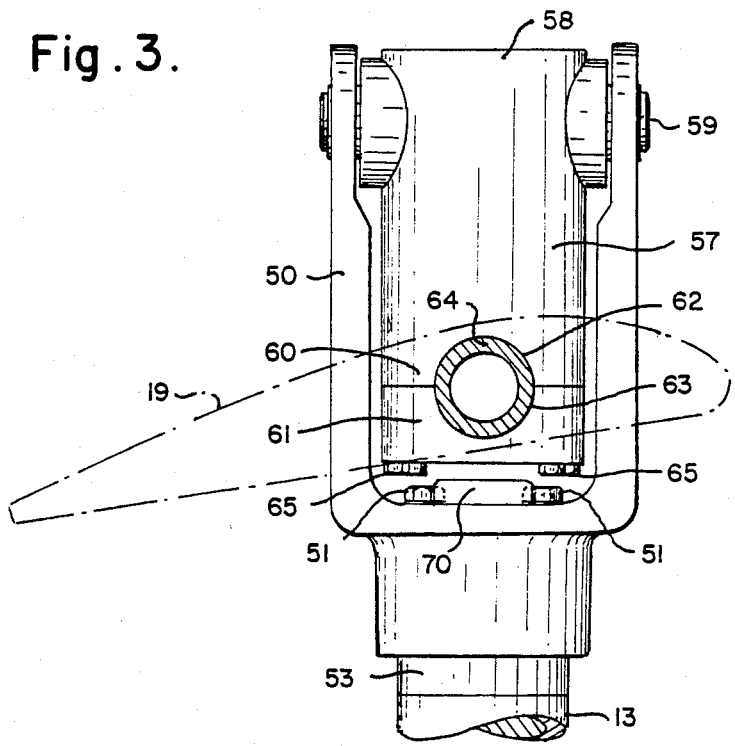
FIG. 3 is an enlarged side elevational view of a presently preferred hub arrangement for the blades of this invention.

The air is carried downwardly and swept along the surface of the ground radially beneath the trees in the fashion as shown in FIG. 1. Such an apparatus when combined with the waste heat from the drive engine has a capacity for providing a reasonable degree of frost protection over a wide area with temperature differentials.

In FIGS. 3 through 6, I have illustrated the presently preferred hub arrangement for the propellor blades of this invention. In this arrangement, I provide a yoke 50 adapted to be removable mounted on the top end of driven shaft 13 by bolts 51 which are threaded into holes 52 in a solid block 53 fixed on the top end of shaft 13. A key way 54 in the hollow base of yoke 50 is designed to accept a key 55 in head 53. A teetering head and blade retaining tube clamp 57 is pivotally mounted at one end 58 on a pivot pin 59 in yoke 50. The other end 60 of the teetering head and blade retaining tube clamp is provided with a removable clamp ring 61. Each of the other end 60 and clamp ring 61 are provided with half circle grooves 62 and 63 respectively adapted to receive and tightly clamp a blade retaining tube 64 between then by means of tightening screws 65 which extend through clamp ring 61 into tube end 60. The rotor blades 19 are bolted onto the blade retaining tube 64 at the desired angle to provide the necessary air velocity. Rubber bumpers 70 are provided on yoke 50 to absorb the shock of abrupt movement of teeter head 57 around its pivot.

In the foregoing specification I have set out certain preferred practices and embodiments of this invention, however, it will be understood that this invention may be otherwise embodiment within the scope of the following claims.

I claim:

1. An apparatus for protecting crops, particularly tree or orchard crops, from frost damage in situtaions where an inversion layer is present comprising a vertical tower fixed to earth against gyration at a level above the crop, a vetical shaft extending lengthwise through said tower, said shaft sized to hold a blade at a position within the inversion layer, a rotor attached to the shaft above the tower so as to be at a position within the inversion layer which will produce a ground effect when the rotor turns, said rotor including a blade retaining member bent upward to form a conical angle, at least two blades of airfoil section, means connecting said blades to said blade retaining member at a pitch angle satisfying the rotor's aerodynamic requirements and drive means drivingly connected to the drive shaft at the bottom of the tower, wherein said blades are positioned at a height sufficient to pick up air in the inversion layer and direct it to the ground to spread out radially along the earth generally beneath the foliage of the crop and then upwardly through and between the foliage and positioned at a height within the ground effect zone of said rotor.

2. An apparatus as claimed in claim 1 wherein the vertical shaft is driven by a horizontal shaft through a pair of bevel gears between said shafts.

3. An apparatus as claimed in claim 2 wherein the horizontal shaft is driven by a motor arranged at the base of the tower so as to provide minimal interference with air flow.

4. An apparatus as claimed in claim 1 wherein the tower projects about one rotor diameter above the ground.

5. An apparatus as claimed in claim 2 wherein the tower projects about one rotor diameter above the ground.

6. An apparatus as claimed in claim 3 wherein the rotor radius $(R_r) = \sqrt{4R_w h}$ when $R_w$ is the radial distance from the rotor's axis of rotation to the nearest foliage and $h_i$ is the tree skirt height.

7. An apparatus for protecting crops, particularly tree or orchard crops, from frost damage in situations where an inversion layer is present comprising a vertical tower fixed to earth against gyration at a level above the crop, a vertical shaft extending lengthwise through said tower, said shaft sized to hold a blade at a position within the inversion layer, a rotor attached to the shaft above the tower so as to be at a position within the inversion layer which will produce a ground effect when the rotor turns, said rotor including a blade retaining member bent upward to form a conical angle, at least two blades of air foil section mounted in the blade retaining member, means connecting said blades to said blade retaining member at a pitch angle satisfying the rotor's aerodynamic requirements, a teetering head mounted in pivot means on the top end of said shaft for teetering rotation, said teetering head fixedly carrying said blade retaining means, and drive means drivingly connected to the drive shaft at the bottom of the tower, wherein said blades are positioned at a height sufficient to pick up air in the inversion layer and direct it to the ground to spread out radially along the earth generally beneath the foilage of the crop and then upwardly through and between the foilage and positioned at a height within the ground effect zone of said rotor wherein the rotor radius $(R_r) = \sqrt{4R_w h_i}$ when $R_w$ is the radial distance from the rotor's axis of rotation to the nearest foliage had $h_i$ is the tree skirt height.

8. An apparatus as claimed in claim 7 wherein the blade retaining member is a blade retaining tube fixed in said teeterin head, said tube having the ends thereof bent upwardly in a conical contour.

9. An apparatus as claimed in claim 8 wherein the pivoting holder is a yoke fixed on the top of the vertical shaft and the teetering head is a clamping head pivoted at one end in said yoke and having a clamp means for said blade retaining tube at the other end.

* * * * *

UNITED STATES PATENT AND TRADEMARK OFFICE
CERTIFICATE OF CORRECTION

PATENT NO. : 4,838,761
DATED : June 13, 1989
INVENTOR(S) : ALAN R. SHEPPARD

It is certified that error appears in the above-identified patent and that said Letters Patent is hereby corrected as shown below:

At [56] References Cited, Patent No. 4,148,594 to Stafford, change 416/62X to --416/102X--.

Column 1, line 26, change "differnetials" to --differentials--.

Column 1, line 44, change "3,309,533" to --3,306,533--.

Column 3, line 6, change "averag" to --average--.

Column 3, line 13, change "pi x $R_r^2$ x $u_o$ = 2pi x $R_w h_i$" to --pi x $R_r^2$ x $u_o$ = 2pi x $R_w$ x $h_i$ x $2u_o$, and $R_r = \sqrt{4 R_w h_i}$--.

Column 3, line 18, change "wing" to --wind--.

Column 3, line 24, change "poses" to --opposes--.

Column 4, line 68, Claim 6, change "$(R_r) = \sqrt{4 R_w h}$" to --$(R_r) = \sqrt{4 R_w h_i}$--.

Column 6, line 13, Claim 8, change "teeterin" to --teetering--.

Signed and Sealed this

Thirteenth Day of March, 1990

Attest:

JEFFREY M. SAMUELS

*Attesting Officer*  *Acting Commissioner of Patents and Trademarks*

UNITED STATES PATENT AND TRADEMARK OFFICE
CERTIFICATE OF CORRECTION

PATENT NO. : 4,838,761

DATED : June 13, 1989

INVENTOR(S) : ALAN R. SHEPPARD

It is certified that error appears in the above-identified patent and that said Letters Patent is hereby corrected as shown below:

Column 1, line 17, change "and" to --an--.

Column 2, line 26, change "rectrograde" to --retrograde--.

Column 2, line 34, change "turbulance" to --turbulence--.

Column 3, line 16, change "shirt" to --skirt--.

Signed and Sealed this

Twenty-second Day of May, 1990

Attest:

HARRY F. MANBECK, JR.

*Attesting Officer*   *Commissioner of Patents and Trademarks*